United States Patent
Ono

(10) Patent No.: US 9,652,185 B2
(45) Date of Patent: May 16, 2017

(54) IMAGE PROCESSING DEVICE, METHOD, AND MEDIUM FOR IMAGE GENERATION AT GLUING MARGIN

(71) Applicant: Konica Minolta, Inc., Chiyoda-ku, Tokyo (JP)

(72) Inventor: Toshihiro Ono, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/825,764

(22) Filed: Aug. 13, 2015

(65) Prior Publication Data

US 2016/0048358 A1 Feb. 18, 2016

(30) Foreign Application Priority Data

Aug. 14, 2014 (JP) ................................. 2014-165152

(51) Int. Cl.
*G06F 3/12* (2006.01)
*G06K 15/02* (2006.01)

(52) U.S. Cl.
CPC .......... *G06F 3/1208* (2013.01); *G06F 3/1219* (2013.01); *G06F 3/1247* (2013.01); *G06K 15/024* (2013.01); *G06K 15/1868* (2013.01)

(58) Field of Classification Search
None
See application file for complete search history.

(56) References Cited

U.S. PATENT DOCUMENTS

| 6,891,970 B1 * | 5/2005 | Suzuki | ................... G06T 11/60 |
|  |  |  | 382/167 |
| 2010/0201702 A1 * | 8/2010 | Franik | ................... G09G 3/001 |
|  |  |  | 345/589 |
| 2011/0051195 A1 * | 3/2011 | Kimoto | ................ H04N 1/3876 |
|  |  |  | 358/1.18 |

(Continued)

FOREIGN PATENT DOCUMENTS

| JP | 2001282151 | * 10/2001 |
| JP | 2001282151 A | 12/2001 |

(Continued)

OTHER PUBLICATIONS

Notification of Reasons for Refusal received from the Japanese Patent Office on Oct. 4, 2016 in corresponding JP Application No. 2014-165152 with full English translation (6 pages).

*Primary Examiner* — Fan Zhang
(74) *Attorney, Agent, or Firm* — Buchanan Ingersoll & Rooney PC

(57) ABSTRACT

An image processing device includes an image generator and an image processor. The image generator generates an image to be formed on one or more sheets each including at least one gluing margin and a normal region other than the gluing margin, so that a whole image of one page is obtained when the gluing margins of the one or more sheets are laid on top of each other. The image processor performs image processing on the image generated by the image generator. The image processor performs the image processing differently depending on whether the image is to be formed on the gluing margin or on the normal region in such a way that an image on the gluing margins laid on top of each other and an image on the normal region have the same density.

16 Claims, 16 Drawing Sheets

(56) References Cited

U.S. PATENT DOCUMENTS

| | | | | |
|---|---|---|---|---|
| 2013/0050718 A1* | 2/2013 | Takahashi | | G03G 15/55 |
| | | | | 358/1.5 |
| 2014/0168283 A1* | 6/2014 | Ouchi | | G09G 3/002 |
| | | | | 345/690 |
| 2015/0254538 A1* | 9/2015 | Fukazawa | | G06K 15/1878 |
| | | | | 358/1.9 |
| 2015/0288843 A1* | 10/2015 | Ishida | | H04N 1/2032 |
| | | | | 358/450 |

FOREIGN PATENT DOCUMENTS

| | | |
|---|---|---|
| JP | 2004-82610 A | 3/2004 |
| JP | 2011-23964 A | 2/2011 |

\* cited by examiner

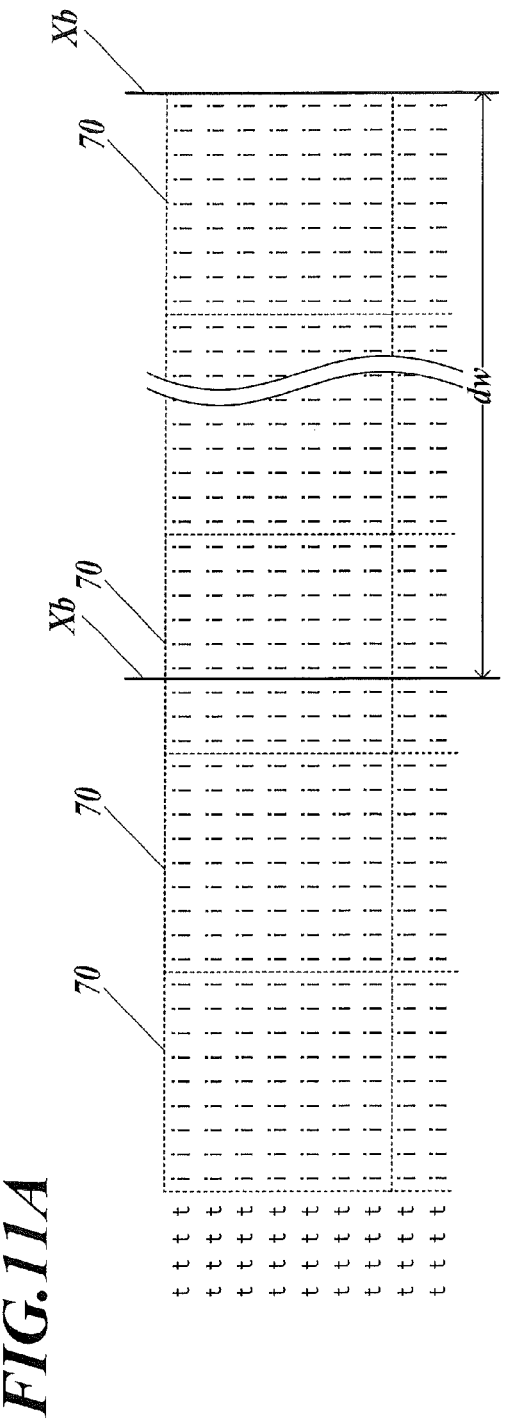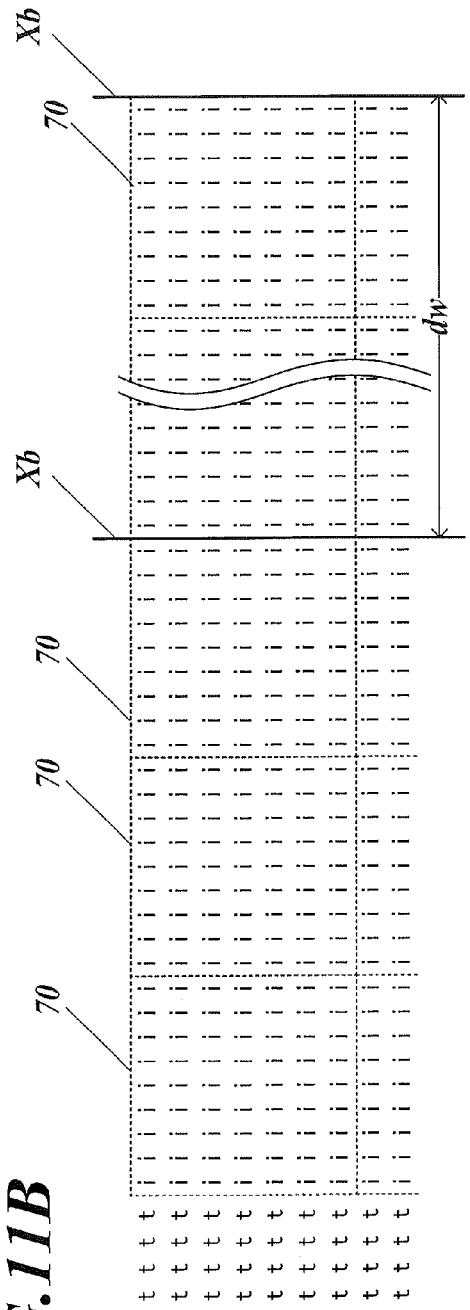

FIG.14

| | | | | | | | | | | | | | | | | | | | | | | | | | A1 |
|---|---|---|---|---|---|---|---|---|---|---|---|---|---|---|---|---|---|---|---|---|---|---|---|---|---|
| 1440 | 1440 | 1440 | 1440 | 1440 | 1440 | 1440 | 1440 | 1440 | 1440 | 1440 | 1440 | 1440 | 1440 | 1440 | 1440 | 1440 | 1440 | 1440 | 1440 | 1440 | 1440 | 1440 | 1440 | 1440 | 1440 |

(Table A1 / B1: rows of 1440 values; Xb marker between)

Xb (⊖) ... (⊖)

T31 / T32 table (with Xb marker):

| 1280 | 2080 | 2880 | 3680 | 4080 | 800 | 1280 | 2080 | 2880 | 3680 | 480 | 1280 | 2080 | 2880 | 3680 | 0 | 480 | 1280 | 2080 |
| 1760 | 800 | 3360 | 4080 | 960 | 1760 | 2560 | 3360 | 4080 | 960 | 2560 | 3360 | 0 | 160 | 960 | 1760 | 2560 | 3360 |
| 2240 | 3040 | 3840 | 2560 | 1440 | 2240 | 3040 | 1760 | 1440 | 2240 | 3040 | 1760 | 640 | 1440 | 0 | 3040 | 2880 |
| 1120 | 3520 | 4080 | 2080 | 1920 | 2720 | 3520 | 800 | 1120 | 320 | 2720 | 3520 | 1280 | 1120 | 1920 | 2720 | 3520 | 320 |
| 3200 | 4000 | 800 | 1600 | 2400 | 3200 | 4000 | 800 | 1600 | 2400 | 3200 | 0 | 800 | 1600 | 2400 | 3200 | 0 | 800 |
| 3680 | 2880 | 1280 | 2080 | 800 | 3680 | 4080 | 1280 | 2080 | 2880 | 480 | 1280 | 0 | 2880 | 2080 | 0 | 2880 | 3680 | 480 | 1280 |
| 1600 | 960 | 1760 | 2560 | 3360 | 4080 | 960 | 1920 | 2560 | 800 | 160 | 960 | 1760 | 2560 | 3360 | 160 | 1120 | 1760 |

FIG. 16

| | | | A4 | | | |
|---|---|---|---|---|---|---|
| 0 | 0 | 0 | 4 | 2 | 0 | 0 |
| 0 | 0 | 0 | 0 | 5 | 3 | 1 |
| 3 | 0 | 5 | 0 | 0 | 0 | 5 |
| 5 | 1 | 0 | 0 | 0 | 0 | 0 |
| 0 | 5 | 3 | 1 | 0 | 0 | 0 |
| 0 | 0 | 0 | 0 | 2 | 0 | 0 |
| 0 | 0 | 0 | 0 | 5 | 3 | 1 |
| 0 | 5 | 0 | 0 | 0 | 0 | 5 |
| 3 | 1 | 0 | 4 | 0 | 0 | 2 |
| 0 | 0 | 0 | 1 | 0 | 0 | 0 |
| 0 | 0 | 0 | 0 | 2 | 0 | 0 |
| 0 | 0 | 2 | 0 | 0 | 0 | 1 |
| 2 | 0 | 0 | 0 | 0 | 0 | 0 |
| 0 | 1 | 0 | 0 | 0 | 2 | 0 |
| 0 | 0 | 0 | 0 | 0 | 0 | 0 |
| 0 | 0 | 0 | 0 | 2 | 0 | 0 |
| 0 | 2 | 0 | 0 | 0 | 0 | 1 |
| 0 | 0 | 0 | 1 | 0 | 0 | 0 |
| | | | B4 | | | |

Xb indicates the horizontal line between rows 9 and 10.

IMAGE PROCESSING DEVICE, METHOD, AND MEDIUM FOR IMAGE GENERATION AT GLUING MARGIN

BACKGROUND OF THE INVENTION

1. Field of the Invention

The present invention relates to an image processing device, an image processing method, and a medium.

2. Description of Related Art

Some image forming apparatuses can print posters by dividing a whole image of one page into images on multiple sheets. The sheets, each of which has a gluing margin, are joined to each other with the gluing margins laid on top of each other for a large image to be obtained.

A region of gluing margins laid on top of each other has light transmittance and reflectance different from a region of a single sheet, causing an image formed across the gluing margin region to be observed as an image with discontinuous densities.

A conventional method controls the density of an image to be formed on a gluing margin of each sheet so that an image on the gluing margins laid on top of each other has a target density. (See Japanese Unexamined Patent Application Publication No. 2004-82610.)

Unfortunately, when an image is formed only on an upper one of superposed sheets to reduce toner consumption, such a conventional density control cannot be applied.

When an image is formed with screen patterns by dithering for halftone reproduction, gradation conversion is repeated in dither matrix units. A dither matrix across the boundary between a gluing margin and a region other than the margin causes conspicuous density discontinuity due to the above-mentioned difference in light transmittance and reflectance.

The size of the dither matrix can be adjusted to the boundary of the margin. (See Japanese Unexamined Patent Application Publication No. 2011-23964.) Unfortunately, it takes time to adjust the size one by one depending on an image to be formed.

SUMMARY OF THE INVENTION

It is an object of the present invention to readily eliminate unevenness in a tone level of an image due to overlapping of sheets.

To achieve the object, according to a first aspect of a preferred embodiment of the present invention, there is provided an image processing device including: an image generator which generates an image to be formed on one or more sheets each including at least one gluing margin and a normal region other than the gluing margin, so that a whole image of one page is obtained when the gluing margins of the one or more sheets are laid on top of each other; and an image processor which performs image processing on the image generated by the image generator, wherein the image processor performs the image processing on the image differently depending on whether the image is to be formed on the gluing margin or on the normal region in such a way that an image on the gluing margins laid on top of each other and an image on the normal region have a same density.

According to a second aspect of a preferred embodiment of the present invention, there is provided an image processing method including: a generating step to generate an image to be formed on one or more sheets each including at least one gluing margin and a normal region other than the gluing margin, so that a whole image of one page is obtained when the gluing margins of the one or more sheets are laid on top of each other; and an image-processing step to perform image processing on the image generated by the generating step, wherein the image-processing step performs the image processing on the image differently depending on whether the image is to be formed on the gluing margin or on the normal region in such a way that an image on the gluing margins laid on top of each other and an image on the normal region have a same density.

According to a third aspect of a preferred embodiment of the present invention, there is provided a non-transitory computer readable medium storing computer program instructions that, when executed by a processor, cause the processor to perform: a generating step to generate an image to be formed on one or more sheets each including at least one gluing margin and a normal region other than the gluing margin, so that a whole image of one page is obtained when the gluing margins of the one or more sheets are laid on top of each other; and an image-processing step to perform image processing on the image generated by the generating step, wherein the image-processing step performs the image processing on the image differently depending on whether the image is to be formed on the gluing margin or on the normal region in such a way that an image on the gluing margins laid on top of each other and an image on the normal region have a same density.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention.

FIG. 8 illustrates block units when the object attribute is text.

FIG. 9 illustrates block units when the object attribute is graphics.

FIG. 10 illustrates block units when the object attribute is photograph.

FIG. 11A illustrates an image segment at and near a gluing margin boundary.

FIG. 11B illustrates the image segment after the adjustment of the gluing margin width.

FIG. 14 illustrates example subtraction tables used for subtraction for a gluing margin region and a normal region other than the margin.

FIG. 16 represents an image after adjustment of the data length of gradation values on the gluing margin and the normal region other than the margin.

DESCRIPTION OF THE PREFERRED EMBODIMENTS

An image processing device, a method of image processing, and a medium in accordance with embodiments of the present invention will now be described with reference to the attached drawings.

Figure 1:
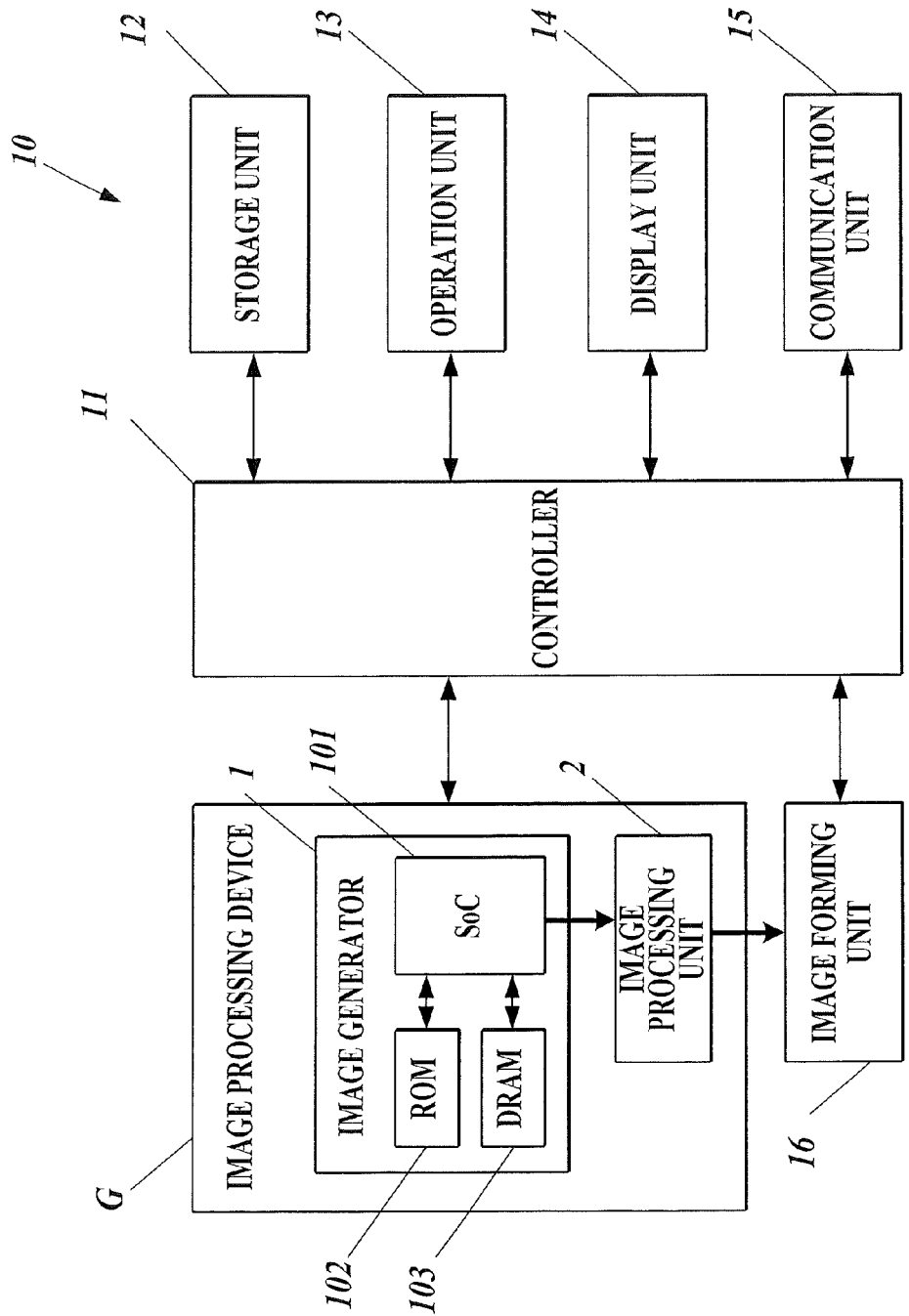
FIG. 1 is a block diagram of an image forming apparatus equipped with an image processing device in accordance with one embodiment of the present invention.

FIG. 1 is a functional block diagram of an image forming apparatus 10 equipped with an image processing device G in accordance with an embodiment of the present invention.

The image forming apparatus 10 includes a controller 11, a storage unit 12, an operation unit 13, a display unit 14, a communication unit 15, an image processing device G, and an image forming unit 16, as shown in FIG. 1.

The controller 11 reads a program stored in the storage unit 12 and executes the program to control each unit of the image forming apparatus 10. The controller 11 can be composed of a central processing unit (CPU) and a random-access memory (RAM), for example.

The controller 11, for example, controls the image processing device G to generate an image in a bitmap format and to perform image processing on the image. The controller 11 controls the image forming unit 16 to form an image on a sheet with color material on the basis of the bitmap image on which the image processing has been performed.

The storage unit 12 stores a program readable by the controller 11 and data used for execution of the program.

The storage unit 12 may be a large-capacity memory, such as a hard disk.

The operation unit 13 generates operation signals in response to user operation and outputs the signals to the controller 11. The operation unit 13 includes keys and a touch panel integrated with the display unit 14.

The display unit 14 displays operation screens in accordance with instructions from the controller 11. The display unit 14 may be a liquid crystal display and an organic electroluminescent (EL) display.

The communication unit 15 communicates with a user terminal, a server, and another image forming apparatus on a network. The communication unit 15, for example, receives data written in a page description language (PDL) (hereinafter referred to as PDL data) from the user terminal.

With reference to FIG. 1, the image processing device G includes an image generator 1 and an image processing unit (image processor) 2.

The image generator 1 generates a bitmap image from the PDL data received through the communication unit 15.

As shown in FIG. 1, the image generator 1 can be composed of a system-on-a-chip (SoC) 101, a read-only memory (ROM) 102, and a dynamic RAM (DRAM) 103.

The image generator 1 performs rasterization in accordance with a program read out by the SoC 101 from the ROM 102 to generate a bitmap image for each of red (R), green (G), and blue (B) from the PDL data received through the communication unit 15. In the bitmap images, each pixel has a gradation value that is eight-bit data indicating the image density in 256 levels. The SoC 101 stores the generated images in the DRAM 103.

The image processing unit 2 performs multiple types of image processing on the images generated by the image generator 1.

Figure 2:
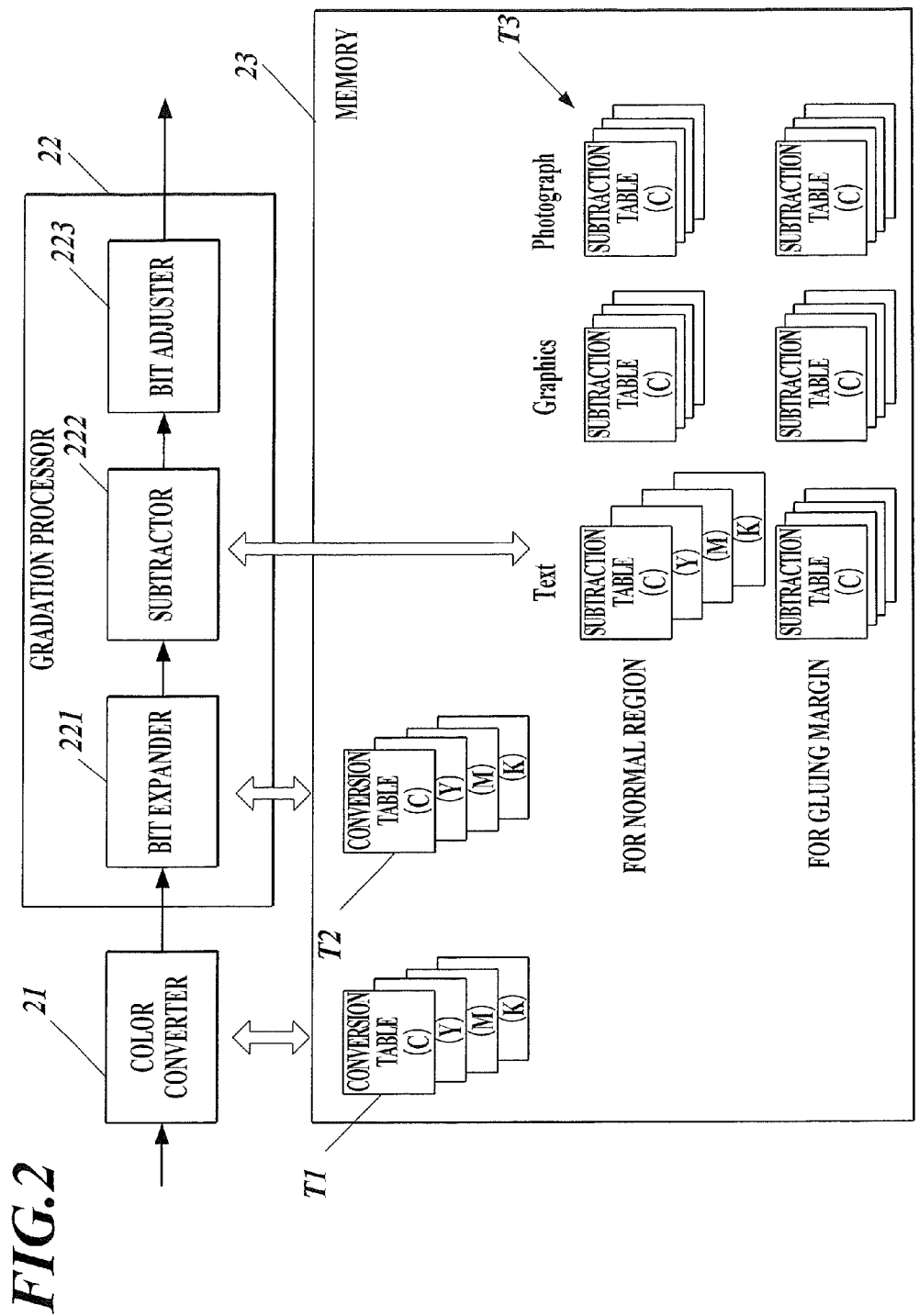
FIG. 2 is a block diagram of an image processing unit in FIG. 1.

FIG. 2 is a functional block diagram of the image processing unit 2.

As shown in FIG. 2, the image processing unit 2 includes a color converter 21, a gradation processor 22, and a memory 23. The image processing unit 2 can be a single application specific integrated circuit (ASIC) for high-speed processing.

The color converter 21 converts the images of R, G, and B into images of cyan (C), magenta (M), yellow (Y), and black (K) with reference to color conversion tables T1 stored in the memory 23.

The gradation processor 22 converts the C, M, Y, and K images into images having a predetermined number of gradations formable in the image forming unit 16.

The gradation processor 22 converts the gradations of an image in such a way that, when an image formed on multiple sheets joined to each other with their gluing margins laid on top of each other is observed, the density of a portion of the image formed on the gluing margins is the same as the density of a portion of the image formed on a normal region other than the gluing margins.

As shown in FIG. 2, the gradation processor 22 includes a bit expander 221, a subtractor 222, and a bit adjuster 223 for gradation conversion.

The bit expander 221 expands the data length of the gradation value of each pixel of the converted images from eight bits to twelve bits with reference to conversion tables T2 stored in the memory 23.

The subtractor 222 performs subtraction on the images, on which the data length expansion has been performed by the bit expander 221, with reference to subtraction tables T3 stored in the memory 23. The subtraction tables T3 contain subtraction values predetermined for m-by-n pixels, where m and n each represent a natural number. At the time of the subtraction, the subtractor 222 checks an image in m-by-n pixel units against a corresponding subtraction table T3 and subtracts, from the gradation value of each of the m-by-n pixels, a subtraction value for a corresponding pixel in the subtraction table T3.

The bit adjuster 223 adjusts the data length of the gradation value of each pixel of each image, on which the subtraction has been performed by the subtractor 222, from twelve bits to four bits to convert the gradation value into a 16-gradation value. In specific, the bit adjuster 223 discards the lower eight bits of the twelve bits to adjust the data length to four bits and outputs each of the 16-gradation images.

The image forming unit 16 forms an image on a sheet using the gradation value of each pixel of the 16-gradation images output from the image processing device G. In the case of using electrophotography, the image forming unit 16 irradiates a photoreceptor with laser light to form a latent image, develops the latent image with a color material, such as toner, and then transfers the image onto a sheet. The pulse signals to be output to a laser light source are pulse-width-modulated in accordance with the gradation value of each pixel of each 16-gradation image. Such pulse width modulation allows the spot size of the laser light to vary in 16 levels to form a 16-gradation image by area coverage modulation.

The image forming apparatus 10 can perform image formation called poster printing. Poster printing is a process of dividing a whole image of one page into image segments and forming the image segments on multiple sheets each having a gluing margin. Each gluing margin is a region on which a gluing margin of another sheet is laid so that multiple sheets are joined to each other.

Figure 3A:
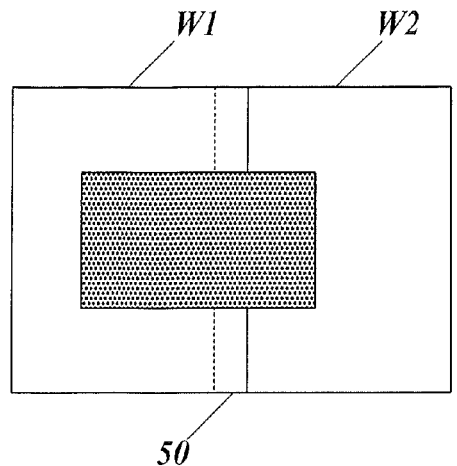
FIG. 3A illustrates an image formed across gluing margins at a uniform density.

FIG. 3A illustrates a case in which a whole image is divided and formed on two sheets W1 and W2. The sheets W1 and W2, each of which has a gluing margin 50, are joined to each other with the gluing margins 50 laid on top of each other to create an image of a two-sheet size. In order to reduce toner consumption, an image is formed on only the gluing margin of the sheet W1, i.e., the upper one of the superposed gluing margins 50 of the sheets W1 and W2.

Figure 3B:
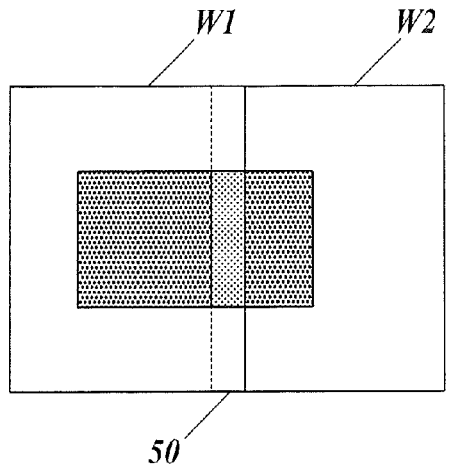
FIG. 3B illustrates an example image having a part on gluing margins observed as lighter than the other part.

When an image is formed across the gluing margins 50 at a uniform density as shown in FIG. 3A, the image portion on the gluing margins 50 may be recognized as having a lower density than the image portion on a normal region other than the gluing margins 50, leading to the image being recognized as having discontinuous gradations as shown in FIG. 3B. This is because the overlapping part of the sheets W1 and W2, i.e., the region of the gluing margins 50 laid on top of each other, has light transmittance and reflectance different from the normal or non-overlapped regions of the sheets.

Figure 4:
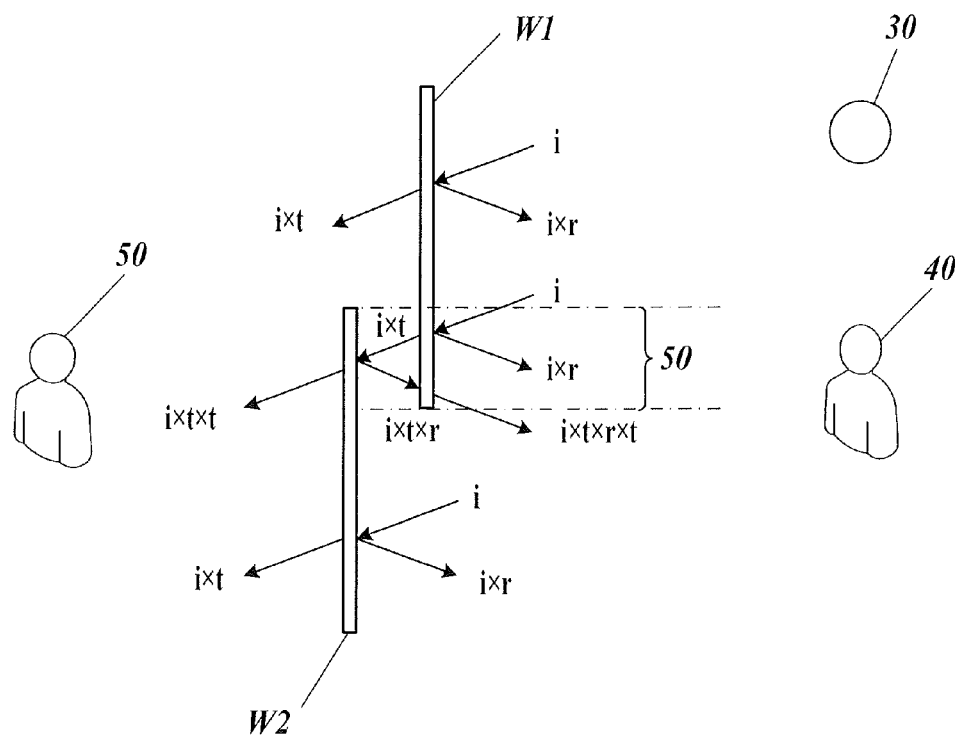
FIG. 4 illustrates transmitted light and reflected light on two overlapping sheets.

FIG. 4 illustrates transmitted light and reflected light on the sheets W1 and W2.

In FIG. 4, let r and t represent the light reflectance and transmittance, respectively, of the sheets W1 and W2 and let i represent the light from a light source 30 in the non-overlapped regions other than the gluing margins 50 of the sheets W1 and W2, and the reflected light and transmitted light are represented by i×r and i×t, respectively. At the gluing margins 50, the transmitted light through the sheet W1 and the transmitted light through the sheets W1 and W2 are represented by i×t and i×t×t, respectively. In addition, the transmitted light i×t is represented by i×t×r after reflection on the sheet W2, and the reflected light i×t×r is represented by i×t×r×t after transmission through the sheet W1.

A viewer 40 on the same side as the light source 30 with respect to the sheets W1 and W2 observes the light i×r as an image on the region other than the gluing margins 50, and observes the light i×t×r×t in addition to the light i×r as an image on the gluing margins 50. The image on the gluing margins 50 observed by the viewer 40 is higher in brightness than the other image; consequently, the viewer recognizes the image on the gluing margins 50 as brighter than the image on the region other than the margins 50 as shown in FIG. 3B, although the image was formed at a uniform density as shown in FIG. 3A.

In contrast, a viewer 50 on the opposite side to the light source 30 side with respect to the sheets W1 and W2 observes the light i×t as an image on the region other than the gluing margins 50, and observes the light i×t×t as an image on the gluing margins 50. The image on the gluing margins 50 observed by the viewer 50 is lower in brightness than the other image; consequently, the viewer recognizes the image on the gluing margins 50 as darker than the image on the region other than the gluing margins 50.

If light sources 30 are disposed on both sides of the sheets W1 and W2, the viewer 40 can observe the transmitted light that is observed by the viewer 50, too. Specifically, the viewer 40 views the reflected light i×r and the transmitted light i×t on the gluing margins 50, and views the reflected light i×r, the reflected light i×t×r×t, and the transmitted light i×t×t on the region other than the gluing margins 50. The viewer 40 observes different lights between the gluing margins 50 and the region other than the gluing margins 50, and thus recognizes the images as having different densities.

The image forming apparatus 10 includes the image processing device G that performs image processing in such a way as to eliminate the discontinuity of the image density caused by the overlapping of the sheets.

Figure 5:
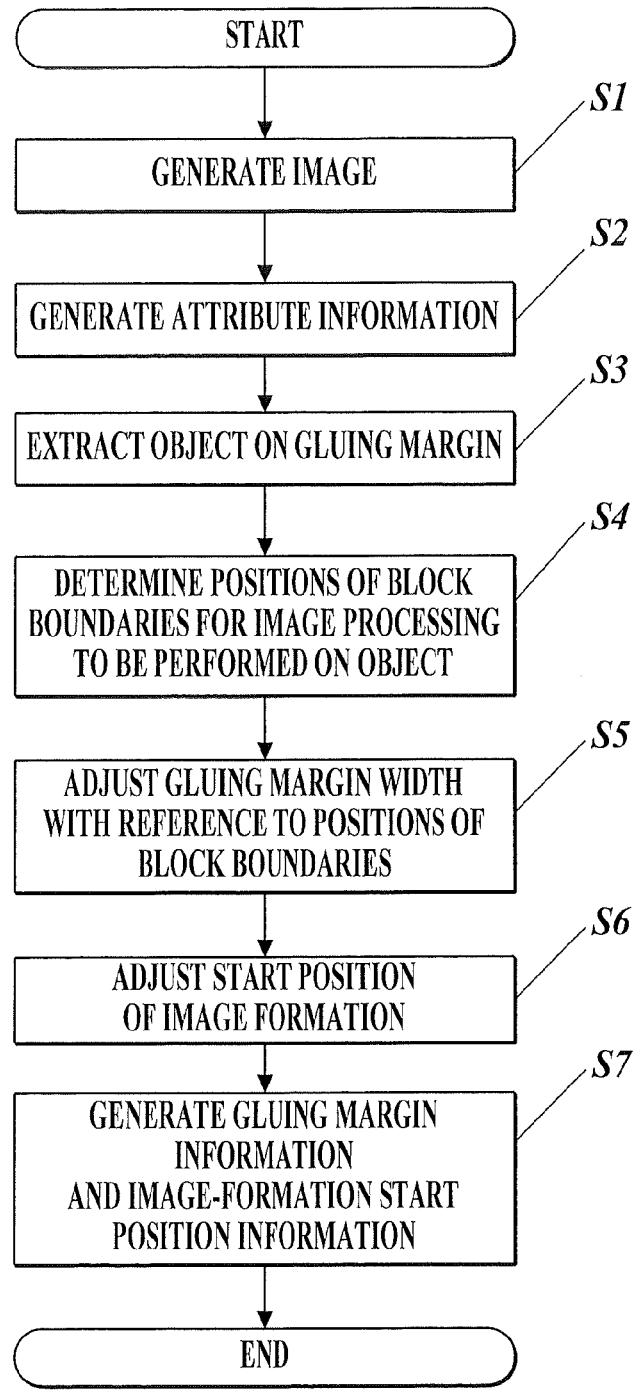
FIG. 5 is a flowchart showing the procedure of image generation by an image generator.

FIG. 5 illustrates a procedure of generating an image for poster printing at the image processing device G.

In the image forming apparatus 10, the communication unit 15 receives PDL data specifying poster printing, and then the controller 11 transfers the PDL data to the image processing device G.

In the image processing device G, the image generator 1 performs rasterization to generate an image in a bitmap format from the PDL data (step S1), as shown in FIG. 5.

Figure 6:
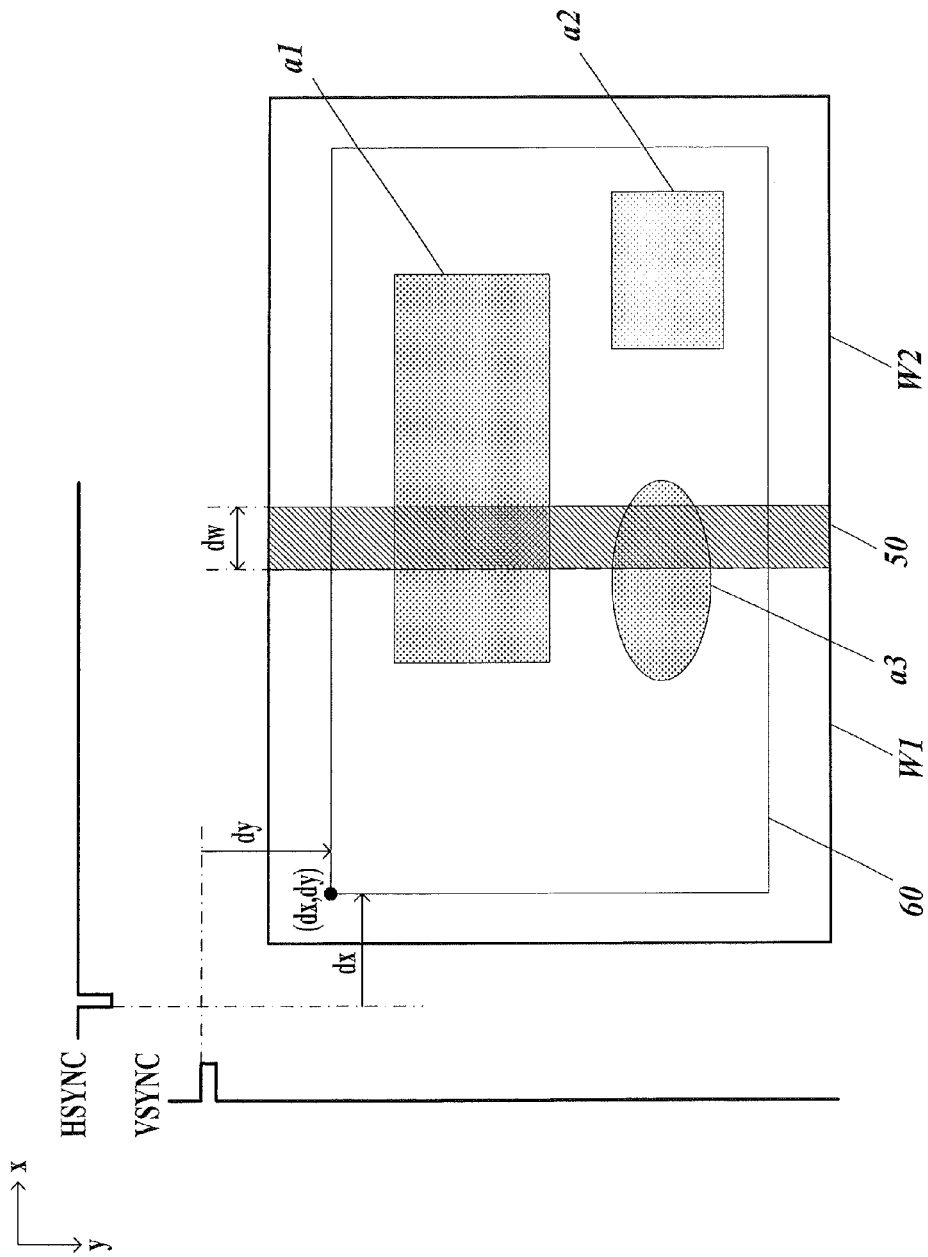
FIG. 6 illustrates two overlapping sheets.

With reference to FIG. 6 illustrating the case of using two sheets, the image generator 1 generates an image having the same size as a valid region 60 available for image formation when the gluing margin 50 of a first sheet W1 is laid on top of the gluing margin 50 of a second sheet W2. The start position (dx, dy) of the valid region 60 for image formation is defined by the number dx of pixels from the falling edge of a synchronizing signal HSYNC indicating the position to start image formation in the main scanning direction x and the number dy of pixels from the rising edge of a synchronizing signal VSYNC indicating the position to start image formation in the sub-scanning direction y.

The image generator 1 generates attribute information indicating the attribute of each pixel of the generated image (step S2). The image generator 1 adds the attribute information to the generated image and stores the image in the DRAM 103. The image generator 1, for example, classifies pixels of an object drawn in accordance with formats, such as a font and a font size, specified by the PDL data as a text attribute; classifies pixels of an object drawn in accordance with graphics formats, such as a border and a quadrilateral, as a graphics attribute; and classifies pixels of an object drawn in accordance with a JPEG file as a photograph attribute. Pixels in a blank other than the area of objects may be classified as a blank attribute, or as the text attribute for convenience.

The image generator 1 then extracts, among objects in the generated image, one or more objects to be formed on the overlapping part of the multiple sheets, i.e., on the region of the gluing margins laid on top of each other (step S3).

When the image contains three objects a1-a3 as shown in FIG. 6, for example, two objects a1 and a3 to be on the gluing margin 50, which is the end part of the sheet W1 and has a width dw in the main scanning direction x, are extracted among the three objects.

The image generator 1 determines the positions of the block boundaries for image processing to be performed on any of the extracted objects in m-by-n-pixel block units (step S4).

In specific, an m-by-n-pixel block is disposed repeatedly from the front end of the image to determine the positions of the block boundaries. If the size of blocks differs depending on the object attribute, the boundary positions may be determined on the basis of a block size corresponding to the attribute of any of the extracted objects.

Figure 7:
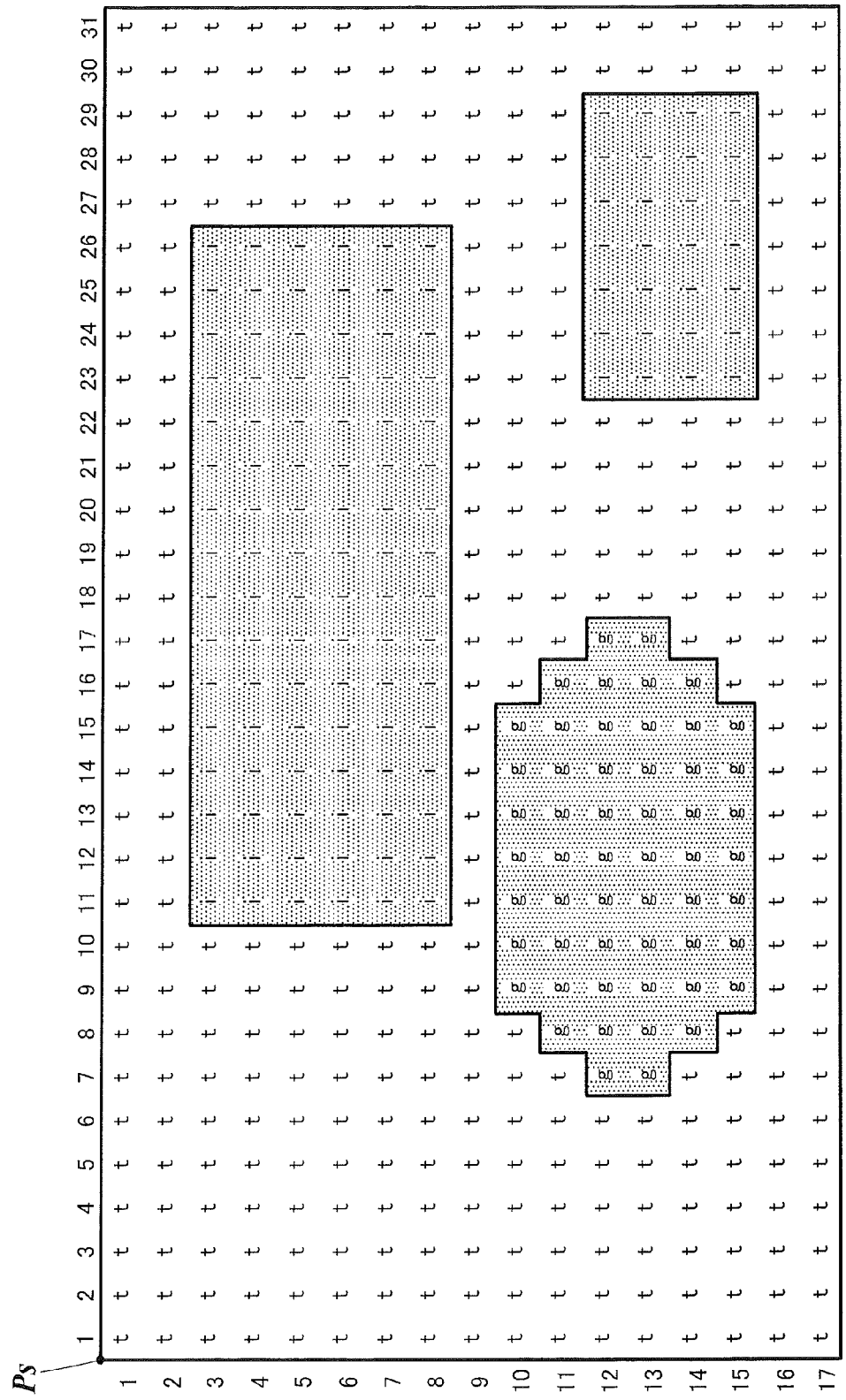
FIG. 7 illustrates pixels of an image by object attribute.

FIG. 7 illustrates an image of 31-by-17 pixels. In FIG. 7, symbols t, g, and i represent pixels of objects whose attributes are text, graphics, and photograph, respectively.

Figure 8:
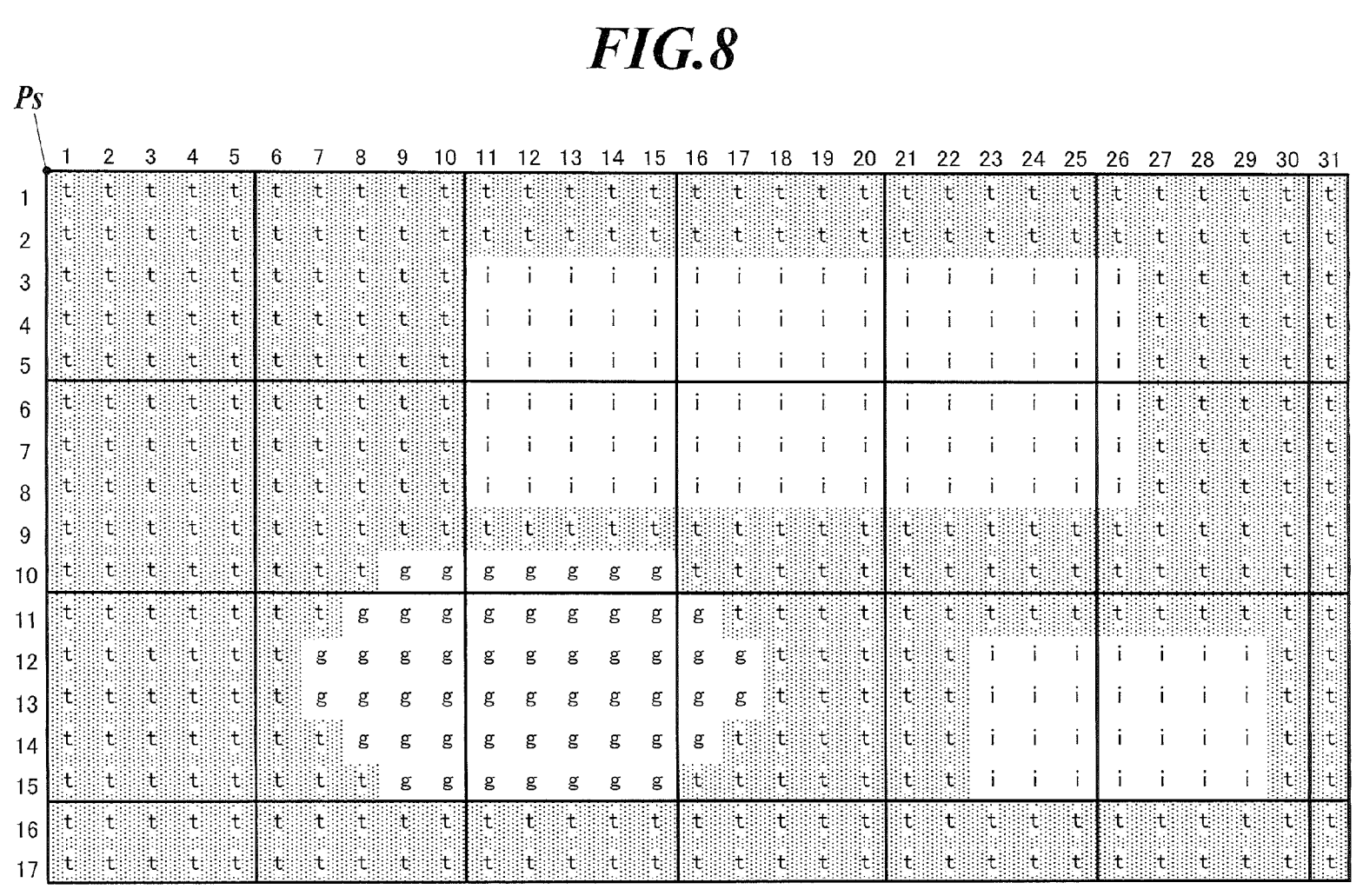

With reference to FIG. 8, if the image processing is performed on a text object in five-by-five-pixel block units, the block boundaries are determined to be at every five pixels in the main scanning direction x and every five pixels in the sub-scanning direction y from the front end Ps of the image.

Figure 9:
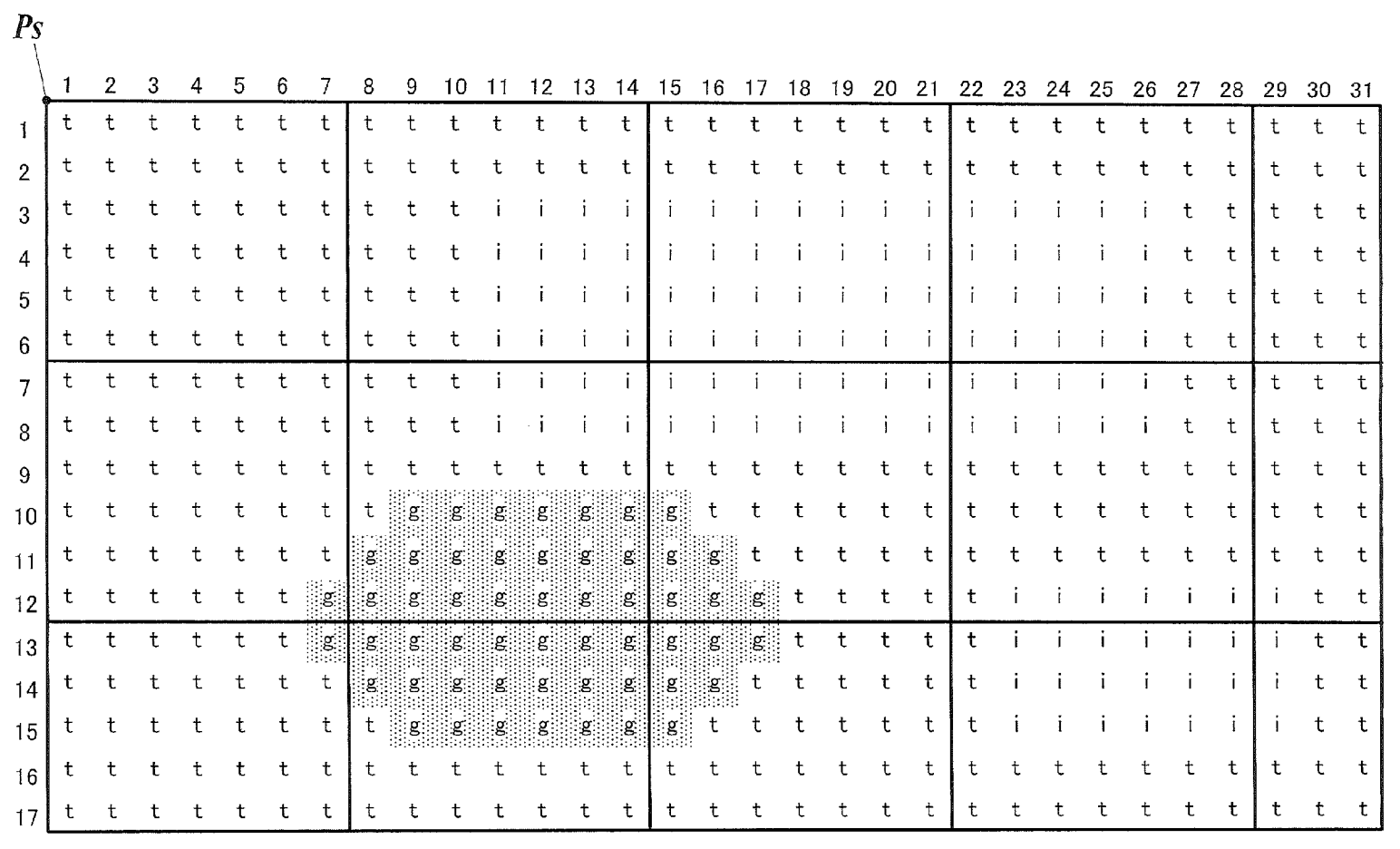

With reference to FIG. 9, if the image processing is performed on a graphics object in seven-by-six-pixel block units, the block boundaries are determined to be at every seven pixels in the main scanning direction x and every six pixels in the sub-scanning direction y from the front end Ps of the image.

Figure 10:
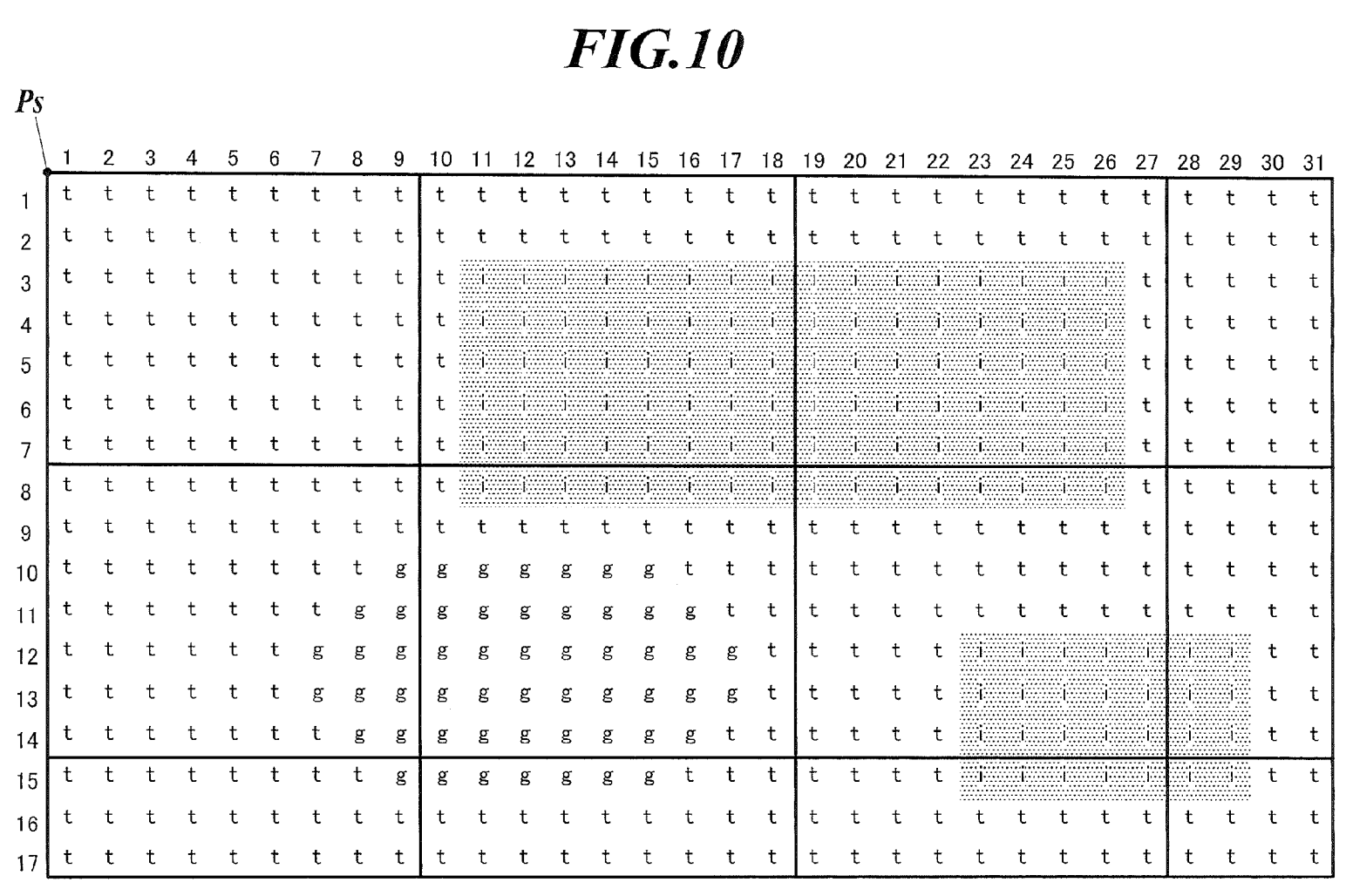

With reference to FIG. 10, if the image processing is performed on a photograph object in nine-by-seven-pixel block units, the block boundaries are determined to be at every nine pixels in the main scanning direction x and every seven pixels in the sub-scanning direction y from the front end Ps of the image.

The image generator 1 adjusts the gluing margin width dw to be an integral multiple of a block width with reference to the block boundary positions determined according to the object attribute (step S5).

If the block boundaries for photograph objects in FIG. 10 are used for the reference, for example, the gluing margin width dw is adjusted to an integral multiple of the block width, nine pixels.

FIG. 11A illustrates an example photograph object to be disposed across the gluing margin.

In the case in which a gluing margin width dw is 600 pixels and a gluing margin boundary position Xb is defined as shown in FIG. 11A, the number of pixels from the boundary position Xb to the position of nearest boundary of the block 70 on the back end side in the main scanning direction x is six. With reference to FIG. 11B, the image generator 1 shifts the gluing margin boundary position Xb toward the back end by six pixels such that the number of pixels is zero, so that the boundary position Xb coincides with a boundary of the block 70. This adjusts the gluing margin width dw from 600 pixels to 594 pixels that are 66 times the width of the block 70, nine pixels. Alternatively, the gluing margin boundary position Xb may be shifted toward the front end in the main scanning direction x by three pixels to adjust the gluing margin width dw from 600 pixels to 603 pixels.

If two or more objects are extracted on a gluing margin, the image generator 1 preferably adjusts the gluing margin width dw with reference to the object having an attribute for which gradation is the most important among the objects. The attribute for which gradation is the most important is the photograph attribute among the text, graphics, and photograph attributes, and the second most important is the graphics attribute.

With reference to FIG. 6, if the object a1 having the photograph attribute and the object a3 having the graphics attribute are to be on the gluing margin 50, for example, the block boundary positions may be determined on the basis of the block size corresponding to the photograph attribute of the object a1 to adjust the gluing margin width dw.

Such adjustment enables accurate switching between image processing for gluing margins and image processing for normal regions at the gluing margin boundary with regard to at least the object having an attribute for which gradation is the most important, thus maintaining satisfying gradation of the objects.

The image generator 1 then adjusts the start position of image formation on the basis of the adjusted gluing margin width in such a way that, when the gluing margins of one or more sheets are laid on top of each other, the whole image is located at the center of the one or more sheets (step S6).

An increase or decrease in the gluing margin width dw due to the adjustment changes the size of the valid region for image formation. This causes misalignment between the center of the valid region and the center of the region of the multiple overlapping sheets, resulting in displacement of the image segments formed on the sheets. If the image segments are formed on the sheets in accordance with the original size of the valid region, space appears between the image segments on the overlapping sheets, or the image segments overlap each other, failing to form one continuous image.

For example, a decrease in the gluing margin width dw by six pixels in the example in FIG. 6 expands the valid region 60 for image formation in the back-end direction and increases the width of the valid region 60 by six pixels. This leads to shift of the center of the valid region 60 for image formation toward the back end by three pixels with respect to the center of the region of the sheets W1 and W2 joined to each other with their gluing margins laid on top of each other. Preferably, the adjustment of the gluing margin width dw is followed by the adjustment of the image-formation start position (dx, dy) to move the center of the valid region 60 toward the back end to align the centers of the valid region 60 and the region of the sheets W1 and W2 joined to each other with their gluing margins laid on top of each other.

In specific, if the number of pixels to the image-formation start position dx is 1000 pixels and the gluing margin width dw decreases by six pixels from 600 pixels to 594 pixels due to the adjustment, the image generator 1 adds three pixels, half of the six pixels for the adjustment, to 1000 pixels to adjust the start position dx to 1003 pixels. This adjustment moves the center of the valid region 60 for image formation toward the back end by three pixels and aligns the center of the valid region 60 with the center of the region of the two sheets W1 and W2 joined to each other with their gluing margins laid on top of each other. The objects are then disposed in the adjusted valid region 60 for image formation. Consequently, one image is formed in the center of the two overlapping sheets W1 and W2 by adjoining the images on the sheets W1 and W2.

The image generator 1 rearranges the objects in the valid region for image formation having the center adjusted through the adjustment of the start position of image formation and generates images to be formed on the sheets. The image generator 1 generates gluing margin information indicating whether each pixel of the generated image is on a gluing margin on the basis of the adjusted gluing margin width. The image generator 1 further generates start position information indicating the adjusted start position of image formation (step S7). The image generator 1 adds the generated gluing margin information and start position information to the generated images to be formed on the sheets and stores the images in the DRAM 103.

The image generator 1 then transfers the images stored in the DRAM 103 to the image processing unit 2. The image processing unit 2 stores the transferred images in the memory 23 and starts image processing.

Figure 12:
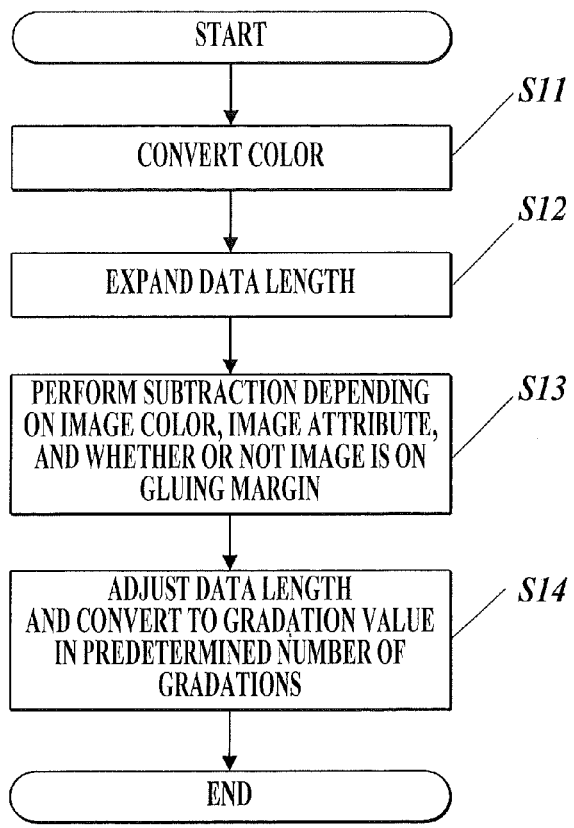
FIG. 12 is a flowchart showing the procedure of image processing by the image processing unit.

FIG. 12 is a flowchart illustrating the procedure of image processing by the image processing unit 2.

With reference to FIG. 12, the color converter 21 converts R, G, and B images stored in the memory 23 to generate C, M, Y, and K images (step S11).

With reference to FIG. 2, the color converter 21 performs the color conversion with reference to the conversion tables T1 stored in the memory 23.

The conversion tables T1 are prepared for respective colors C, M, Y, and K. The conversion tables T1 contain gradation values of C, M, Y, and K corresponding to combinations of R, G, and B gradation values. The color converter 21 retrieves C, M, Y, and K gradation values corresponding to R, G, and B gradation values of pixels of images from their respective conversion tables T1.

The gradation processor 22 converts the C, M, Y, and K images obtained through the color conversion into images expressed in a predetermined number of gradations formable in the image forming unit 16.

In the gradation processor 22, the bit expander 221 expands the data length of the gradation value of each pixel of the converted images from eight bits to twelve bits with reference to the conversion tables T2 stored in the memory 23 (step S12).

The conversion tables T2 contain twelve-bit gradation values obtained by multiplying eight-bit gradation values (i.e., from 0 to 256) by 16. The conversion table T2 is prepared for each of C, M, Y, and K colors. The bit expander 221 retrieves a twelve-bit gradation value corresponding to the eight-bit gradation value of each pixel of each image from one of the conversion tables T2 corresponding to the image color and outputs the value to expand the data length. The data length expansion enables highly accurate gradation conversion and reduces loss of low-gradation images due to processing at the subsequent subtractor 222 and bit adjuster 223.

The bit expander 221 may increase the degree of bit expansion for the data length of low gradation values to effectively prevent loss of low-gradation images due to processing at the subsequent subtractor 222 and bit adjuster 223. For example, while gradation values are normally multiplied by 16 to expand the length from eight bits to twelve bits, low gradation values, such as values of 0-30% of the overall gradation value range, may be multiplied by 24.

Figure 13:
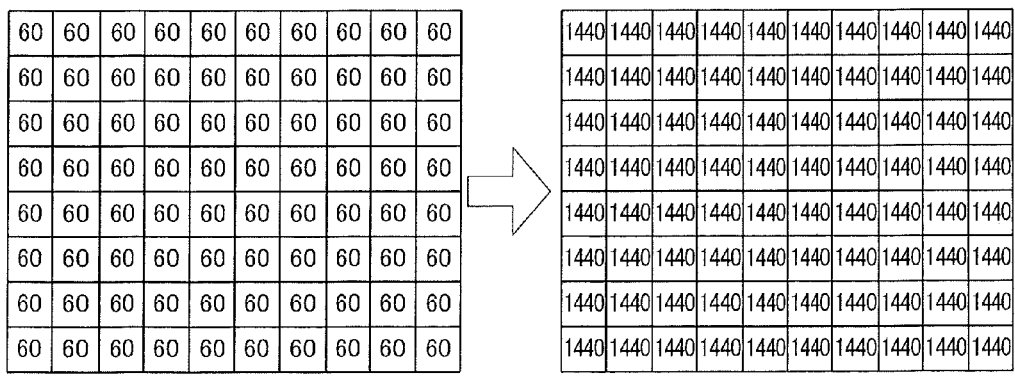
FIG. 13 illustrates example expanded bits of gradation values of ten-by-eight pixels.

FIG. 13 illustrates example expanded bits of gradation values of ten-by-eight pixels.

The original gradation values are 60, which is a low gradation value; thus, each gradation value is multiplied by 24 and converted into a gradation value of 1440.

With reference to FIGS. 8-10, the subtractor 222 inputs of the image, whose data length has been expanded by the bit expander 221, in m-by-n-pixel block units according to the object attribute from the front end Ps of the image. The subtractor 222 performs subtraction to each image of m-by-n pixels with reference to one of the subtraction tables T3 stored in the memory 23 depending on conditions including the color of the image (C, M, Y, or K), the attribute of the image, and whether the image is to be formed on a gluing margin (step S13). The attribute of the image and whether the image is to be on a gluing margin are determined by the attribute information and gluing margin information added to the image.

The subtraction tables T3 contain subtraction values predetermined for m-by-n pixels as described above. The subtractor 222 checks the image in m-by-n-pixel block units against a subtraction table T3 and subtracts, from the gradation value of each of m-by-n pixels, a subtraction value at a corresponding position in the subtraction table T3. This indicates that the subtraction is repeated in m-by-n-pixel block units.

With reference to FIG. 2, the multiple subtraction tables T3 are prepared for combinations of the color of the image (C, M, Y, and K), the attribute of the image (text, graphics, and photograph), and whether or not the image is to be formed on a gluing margin.

Subtraction values are adjusted between the subtraction tables T3 for gluing margins and the subtraction tables T3 for normal regions other than gluing margins in such a way that the density of an image on the gluing margins is the same as the density of an image on a normal region other than the gluing margins when the gluing margins of the multiple sheets are laid on top of each other. The subtraction is performed with reference to different subtraction tables T3 depending on whether the image is to be formed on a gluing margin, that is, whether the image is to be formed on one sheet or two superposed sheets. The image formed on the gluing margins and the image formed on the normal region can thereby have the same density.

If an image portion on gluing margins is observed brighter than an image portion on the region other than the gluing margins, for example, subtraction values in the subtraction tables T3 for gluing margins are adjusted to be smaller than those in the subtraction tables T3 for normal regions in such a way that the densities of the portions are the same. If an image portion on gluing margins is observed darker than an image portion on the region other than the gluing margins, subtraction values in the subtraction tables T3 for gluing margins are adjusted to be larger than those in the subtraction tables T3 for normal regions in such a way that the densities of the portions are the same.

The degree of importance of gradations varies depending on the attribute of an image, and the visual sensitivity varies depending on the color of an image. Thus, the subtraction is performed with reference to different subtraction tables T3 depending on the attribute and color of the image. This allows the image on the gluing margins and the image on the normal region to have exactly the same density.

FIG. 14 illustrates an example image at and near the gluing margin boundary position. In FIG. 14, the right of the gluing margin boundary position Xb is an image A1 to be formed on the gluing margin, and the left is an image B1 to be formed on the normal region other than the margin.

The subtraction is performed on the image A1 for the gluing margin with reference to a subtraction table T31 for gluing margins, while the subtraction is performed on the image B1 for the normal region with reference to a subtraction table T32 for normal regions as shown in FIG. 14. The subtraction values in the subtraction table T31 for gluing margins are adjusted to be smaller than those in the subtraction table T32 for normal regions to increase the density of the image A1 on the gluing margin, as shown in FIG. 14.

The subtraction tables T3 may be prepared according to the type of the sheet, such as coated paper, high-quality paper, and thin paper, in addition to the color of the image (C, M, Y, and K), the attribute of the image (text, graphics, and photograph), and whether or not the image is to be formed on a gluing margin. Subtraction values are provided to allow the image formed on gluing margins and the image formed on a normal region to have the same density. The subtraction may be performed with reference to one subtraction table T3 depending on the combination of these conditions among the multiple subtraction tables T3.

Different types of sheets have different light transmittances and reflectances. If different subtraction tables T3 are used for different types of sheets to perform the subtraction, an image having a uniform density can be formed regardless of the type of the sheet.

The subtractor 222 modifies gradation values outside of the gradation range, i.e., gradation values below zero, to zero among the gradation values after the subtraction.

Figure 15:
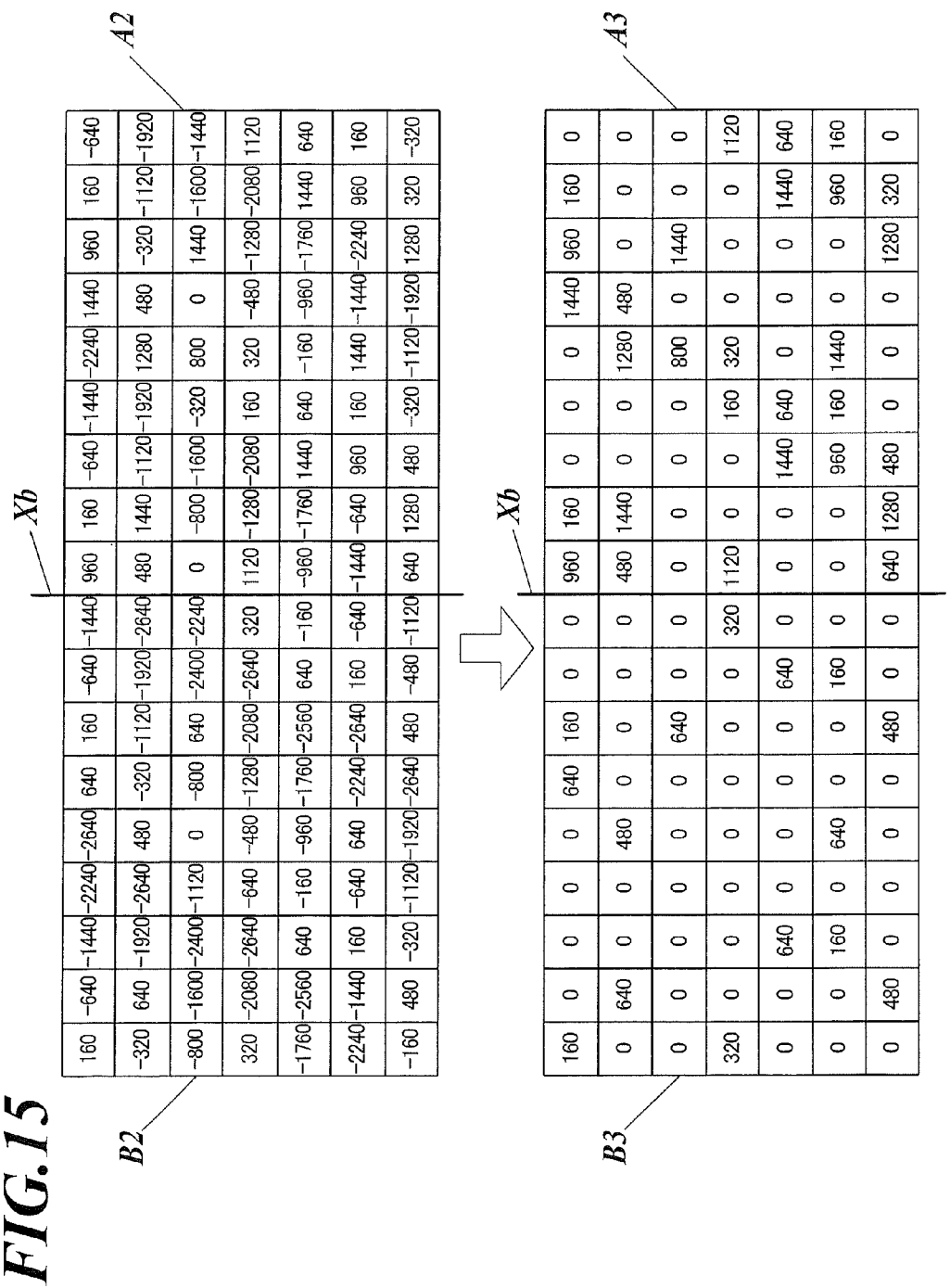
FIG. 15 represents images, obtained through subtraction, on the gluing margin and the normal region other than the margin.

FIG. 15 illustrates images A2 and B2 obtained through the subtraction on the images A1 and B1, respectively, in FIG.

14. The images A2 and B2 contain gradation values below zero, which are modified to zero. Images A3 and B3 are obtained through modification of the gradation values of the images A2 and B2.

The bit adjuster 223 adjusts the data length of the gradation value of each pixel of the image, on which the subtraction has been performed by the subtractor 222, to four bits to convert the gradation value into a 16-gradation value (step S14). For a gradation value of a data length expanded to twelve bits, the bit adjuster 223 discards the lower eight-bit data and sets the higher four-bit data as the gradation value.

The number of bits adjusted by the bit adjuster 223 is determined in accordance with the number of gradations reproducible in the image forming unit 16. If the spot size of laser light emitted from the image forming unit 16 at the time of exposure varies in 16 levels through pulse width modulation, for example, the data length may be adjusted to four bits as described above. If the spot size varies in four levels, the data length may be adjusted to two bits.

FIG. 16 illustrates images A4 and B4 obtained by adjusting the data length of the images A3 and B3, respectively, in FIG. 15 to four bits.

The subtraction values for gluing margins are smaller than those for normal regions; thus, many of the pixels in the image A4 on the gluing margin have gradation values larger than those of the image B4 for the normal region.

The image obtained through such image processing is output together with the image-formation start position information to the image forming unit 16. When the count values of the pixel clocks from the synchronizing signals HSYNC and VSYNC reach dx and dy, respectively, the image forming unit 16 starts image formation.

An example of the image processing for two sheets arranged in the main scanning direction x with an overlapping part therebetween has been described. The image processing for two sheets arranged in the sub-scanning direction y with an overlapping part therebetween can also be performed in the same manner.

In the case of overlapping two or more sheets, the memory 23 may have multiple subtraction tables each containing subtraction values determined according to the combination of the image color, the image attribute, whether or not the image is to be formed on a gluing margin, and the number of gluing margins to be laid on top of each other. The subtraction may be performed with reference to one of the subtraction tables according to the combination.

Figure 17:
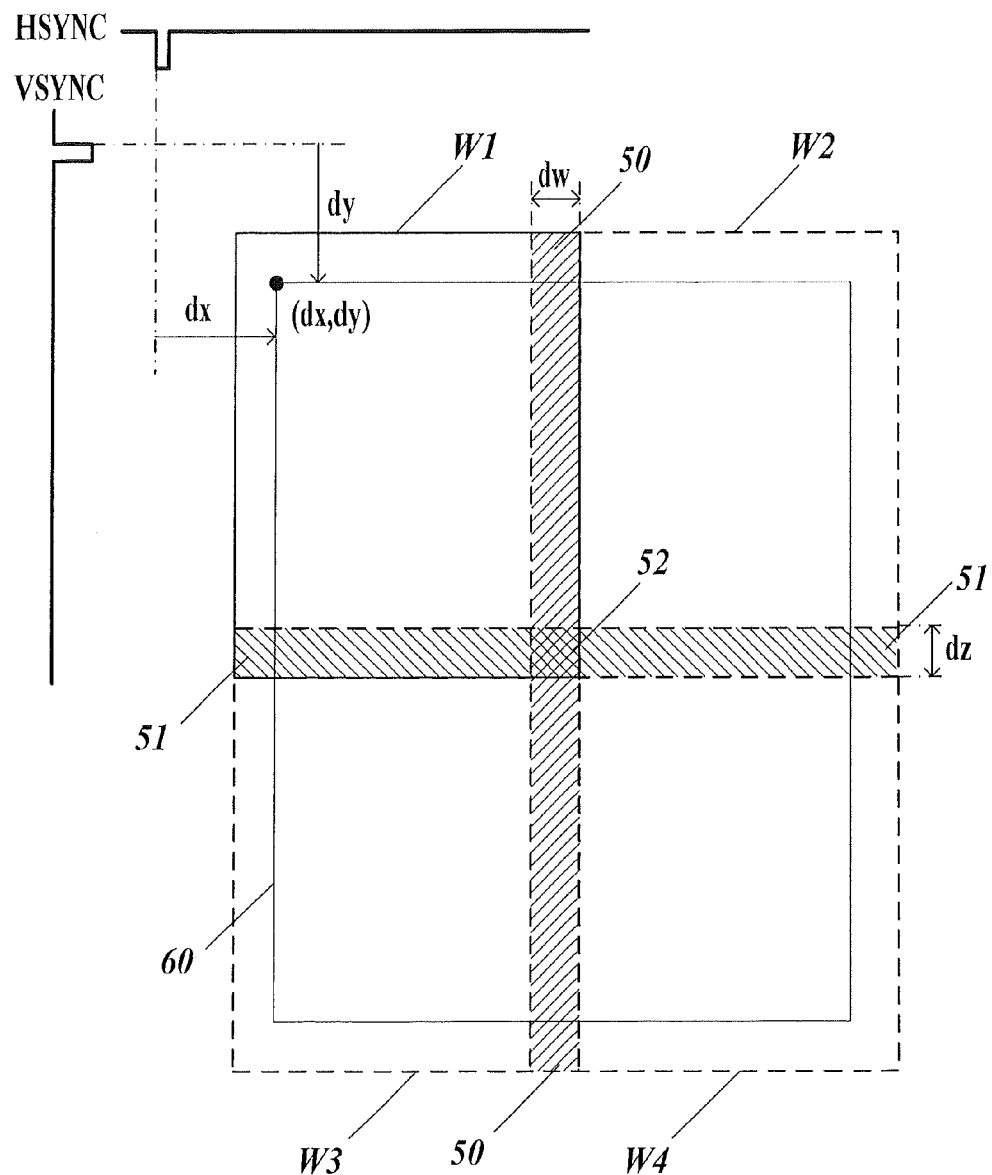
FIG. 17 illustrates four overlapping sheets.

FIG. 17 illustrates four sheets joined to each other with their gluing margins laid on top of each other.

As shown in FIG. 17, the overlapping parts of the sheets W1-W4 include parts where two gluing margins 50 are laid on top of each other with respect to the main scanning direction x, parts where two gluing margins 51 are laid on top of each other with respect to the sub-scanning direction y, and a part where four gluing margins 52 are laid on top of each other with respect to the main scanning direction x and the sub-scanning direction y.

In the case of overlapping four sheets, the width dw of the gluing margins 50 and the start position dx of a valid region for image formation in the main scanning direction x may be adjusted in the same manner as described above, and the width dz of the gluing margins 51 and the start position dy of the valid region 60 for image formation in the sub-scanning direction y may be adjusted in the same manner as in the main scanning direction x. The width dz of the gluing margins 51 is adjusted on the basis of the width of blocks for image processing in the sub-scanning direction y. These adjustments also determine the widths dw and dz of the gluing margins 52 and the start position (dx, dy) of the valid region 60 for image formation.

Figure 18:
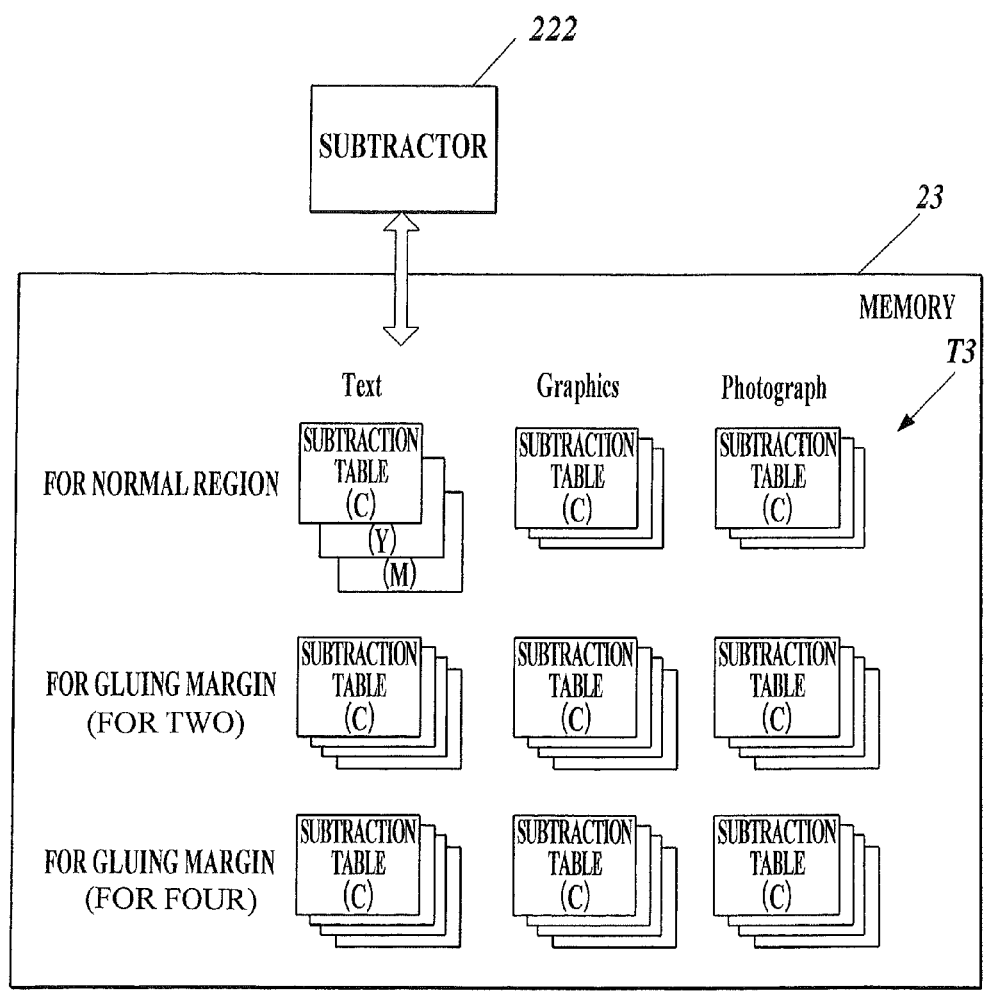
FIG. 18 illustrates example subtraction tables for gluing margins prepared according to the number of gluing margins to be laid on top of each other, i.e., two and four.

In the case of overlapping four sheets W1-W4, additional subtraction tables T3 for gluing margins are prepared for two gluing margins and four gluing margins, as shown in FIG. 18. The tables contain subtraction values predetermined according to the number of gluing margins to be superposed, two and four. When an image on the gluing margins are observed as brighter as the number of superposed gluing margins increases, subtraction values in the subtraction tables T3 for four gluing margins are adjusted to be smaller than those for two gluing margins. The subtractor 222 performs the subtraction differently between the images to be formed on the gluing margins 50 and 51 and the image to be formed on the gluing margins 52. Specifically, the subtractor 222 performs the subtraction on the images to be formed on the gluing margins 50 and 51 with reference to the subtraction tables T3 for two gluing margins and performs the subtraction on the image to be formed on the gluing margins 52 with reference to the subtraction tables T3 for four gluing margins.

The image processing device G in accordance with the embodiments of the present invention includes the image generator 1 and the image processing unit 2. The image generator 1 generates an image to be formed on one or more sheets each including at least one gluing margin and a normal region other than the gluing margin, so that a whole image of one page is obtained when the gluing margins of the one or more sheets are laid on top of each other. The image processing unit 2 performs image processing on the image generated by the image generator 1. The image processor 2 performs the image processing differently depending on whether the image is to be formed on the gluing margin or on the normal region in such a way that an image on the gluing margins laid on top of each other and an image on the normal region have the same density.

Accordingly, the image processing is performed differently between the image to be formed on the gluing margin and the image to be formed on the normal region other than the margin, so that the images on the both regions have the same density. The image processing readily eliminates unevenness of a tone level of an image due to overlapping of sheets.

The preferred embodiments described above are given for illustration but not limitation and may be appropriately modified within the scope of the present invention.

Such image processing readily eliminates the discontinuity of an image density over overlapping sheets not only in the case of multiple overlapping sheets but, for example, in the case of cylindrical printed matter, such as a bottle label, of a single sheet having two gluing margins at its ends to be laid on top of each other.

Image processing in block units in accordance with some embodiments of the present invention include screening for binarizing gradation values with an m-by-n-pixel dither matrix and compression in m-by-n pixel units as well as the gradation processing using the subtraction.

The present invention can be applied to the case in which an image is also formed on a lower one of the superposed gluing margins of the sheets. In this case, subtraction values in the subtraction tables T3 for gluing margins and for normal regions may be determined in such a way that an image on the gluing margins laid on top of each other and an image on a normal region other than the margins have the same density.

The controller 11 may read image generating and image processing programs stored in the storage unit 12 to perform the processing procedure of the image processing device G. Instead of the image forming apparatus 10, a print controller and a computer such as a general-purpose personal computer connected to the image forming apparatus 10 may read the programs to perform the processing procedure.

Computer-readable media for the programs include non-volatile memory such as ROM and flash memory and a portable recording medium such as a CD-ROM. Media for providing program data through communication lines include a carrier wave.

The entire disclosure of Japanese Patent Application No. 2014-165152 filed on Aug. 14, 2014 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image processing device comprising:
   an image generator which generates an image to be formed on one or more sheets each including at least one gluing margin and a normal region other than the gluing margin, so that a whole image of one page is obtained when the gluing margins of the one or more sheets are superimposed, wherein the image generator generates an image on only one of an upper one and a lower one of the gluing margins of the one or more sheets; and
   an image processor which performs image processing on the image generated by the image generator, wherein
   the image processor performs the image processing on the image differently depending on whether the image is to be formed on the gluing margin or on the normal region in such a way that an image on the gluing margins, wherein superimposed, and an image on the normal region are observed to have a same density when the images are observed by a viewer,
   the image processor performs the image processing in block units,
   the image generator extracts, from the image, one or more objects to be located on the gluing margin and adjusts a width of the gluing margin to be an integral multiple of a width of a block of the block units in which the image processing is performed on any of the extracted objects, and
   the image generator adjusts the width of the gluing margin with reference to an object having an attribute for which gradation is the most important among the objects to be located on the gluing margin.

2. The image processing device according to claim 1, wherein the image processor performs the image processing differently depending on the number of gluing margins to be superimposed.

3. The image processing device according to claim 1, wherein the image processor performs the image processing differently depending on a color and an attribute of the image.

4. The image processing device according to claim 1, wherein the image processor performs the image processing differently depending on a type of the one or more sheets.

5. The image processing device according to claim 1, wherein the image generator adjusts a start position of image formation on the basis of the adjusted width of the gluing margin in such a way that, when the gluing margins of the one or more sheets are superimposed, the whole image of one page is located at a center of the one or more sheets.

6. The image processing device according to claim 1, wherein the image processing performed in the block units is gradation processing; and
   the image processor performs the gradation processing on the image differently depending on whether the image is to be formed on the gluing margin or on the normal region in such a way that the image on the gluing margins, when superimposed, and the image on the normal region have the same density.

7. An image processing method comprising:
   a generating step to generate an image to be formed on one or more sheets each including at least one gluing margin and a normal region other than the gluing margin, so that a whole image of one page is obtained when the gluing margins of the one or more sheets are superimposed, wherein an image is generated on only one of an upper one and a lower one of the gluing margins of the one or more sheets; and
   an image-processing step to perform image processing on the image generated by the generating step, wherein
   the image-processing step performs the image processing on the image differently depending on whether the image is to be formed on the gluing margin or on the normal region in such a way that an image on the gluing margins, when superimposed, and an image on the normal region are observed to have a same density when the images are observed by a viewer,
   the image processing step further performs the image processing in block units,
   the image generating step further extracts, from the image, one or more objects to be located on the gluing margin and adjusts a width of the gluing margin to be an integral multiple of a width of a block of the block units in which the image processing is performed on any of the extracted objects, and
   the image generating step further adjusts the width of the gluing margin with reference to an object having an attribute for which gradation is the most important among the objects to be located on the gluing margin.

8. A non-transitory computer readable medium storing computer program instructions that, when executed by a processor, cause the processor to perform the image processing method of claim 7.

9. An image processing device comprising:
   an image generator which generates an image to be formed on one or more sheets each including at least one gluing margin and a normal region other than the gluing margin, so that a whole image of one page is obtained when the gluing margins of the one or more sheets are superimposed; and
   an image processor which performs image processing on the image generated by the image generator, wherein
   the image processor performs the image processing in such a way that an image on the gluing margin has a density which is larger than a density of an image on the normal region,
   the image processor performs the image processing in block units,
   the image generator extracts, from the image, one or more objects to be located on the gluing margin and adjusts a width of the gluing margin to be an integral multiple of a width of a block of the block units in which the image processing is performed on any of the extracted objects, and the image generator adjusts the width of the gluing margin with reference to an object having an attribute for which gradation is the most important among the objects to be located on the gluing margin.

10. The image processing device according to claim 9, wherein the image processor performs the image processing differently depending on the number of gluing margins to be superimposed.

11. The image processing device according to claim 9, wherein the image processor performs the image processing differently depending on a color and an attribute of the image.

12. The image processing device according to claim 9, wherein the image processor performs the image processing differently depending on a type of the one or more sheets.

13. The image processing device according to claim 9, wherein the image generator adjusts a start position of image formation on the basis of the adjusted width of the gluing margin in such a way that, when the gluing margins of the one or more sheets are superimposed, the whole image of one page is located at a center of the one or more sheets.

14. The image processing device according to claim 9, wherein
the image processing performed in the block units is gradation processing; and
the image processor performs the gradation processing on the image differently depending on whether the image is to be formed on the gluing margin or on the normal region in such a way that the image on the gluing margins, when superimposed, and the image on the normal region have the same density.

15. An image processing method comprising:
an image generating step to generate an image to be formed on one or more sheets each including at least one gluing margin and a normal region other than the gluing margin, so that a whole image of one page is obtained when the gluing margins of the one or more sheets are superimposed; and
an image processing step to perform image processing on the image generated in the image generating step, wherein
the image processing step includes performing the image processing in such a way that an image on the gluing margin has a density which is larger than a density of an image on the normal region,
the image processing step further performs the image processing in block units,
the image generating step further extracts, from the image, one or more objects to be located on the gluing margin and adjusts a width of the gluing margin to be an integral multiple of a width of a block of the block units in which the image processing is performed on any of the extracted objects, and
the image generating step further adjusts the width of the gluing margin with reference to an object having an attribute for which gradation is the most important among the objects to be located on the gluing margin.

16. A non-transitory computer readable medium storing computer program instructions that, when executed by a processor, cause the processor to perform the image processing method of claim 15.

* * * * *